United States Patent Office 2,779,557
Patented Jan. 29, 1957

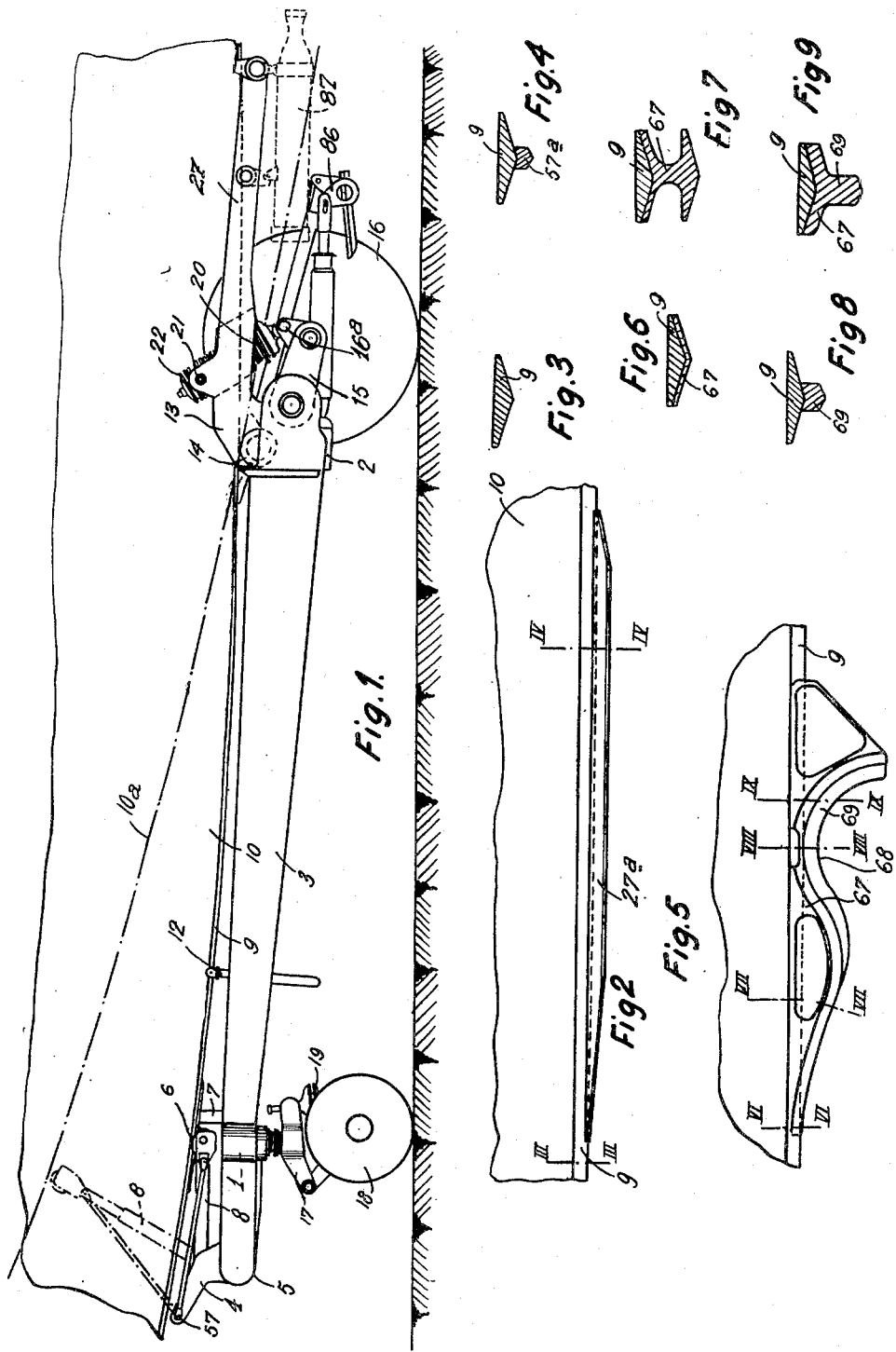

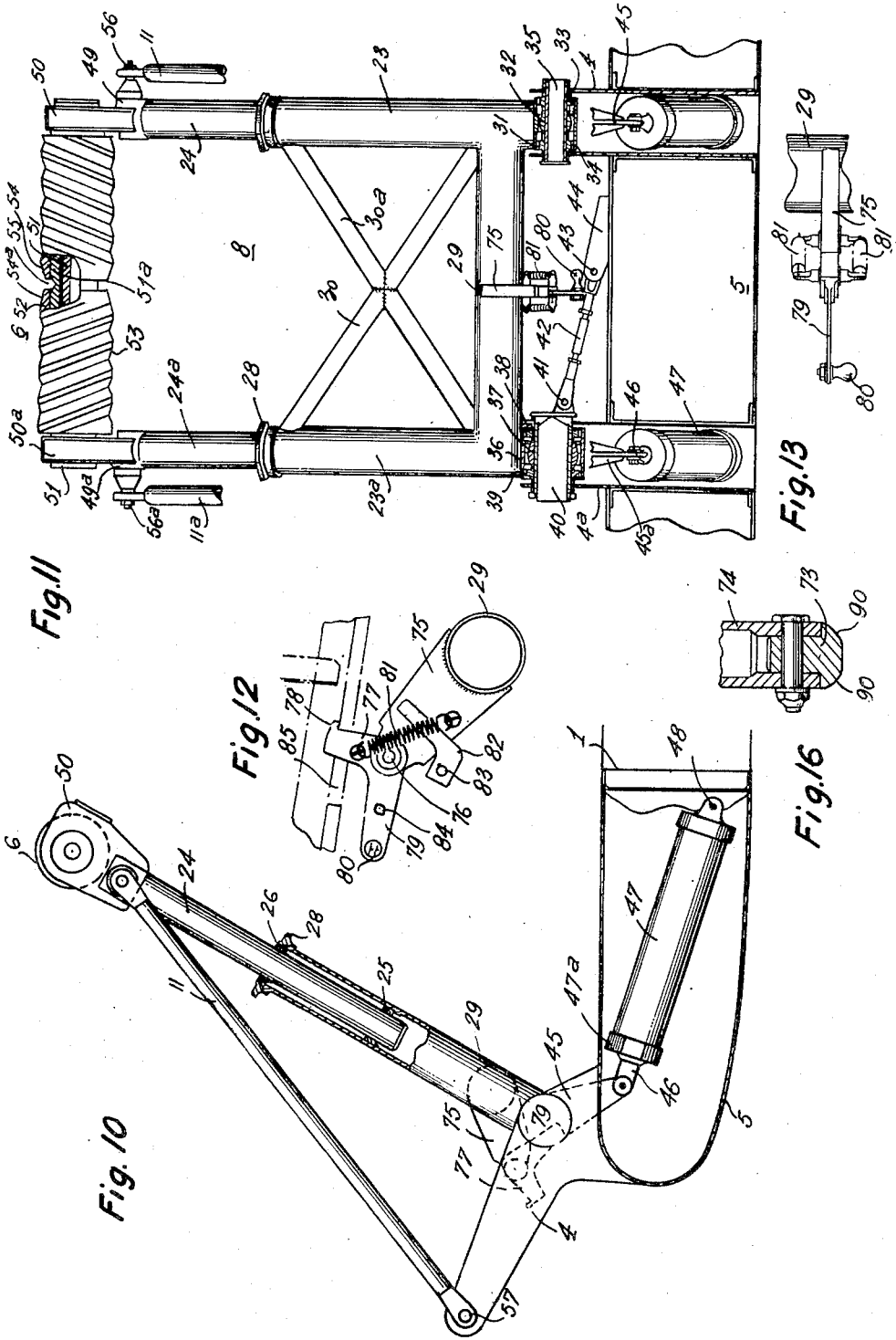

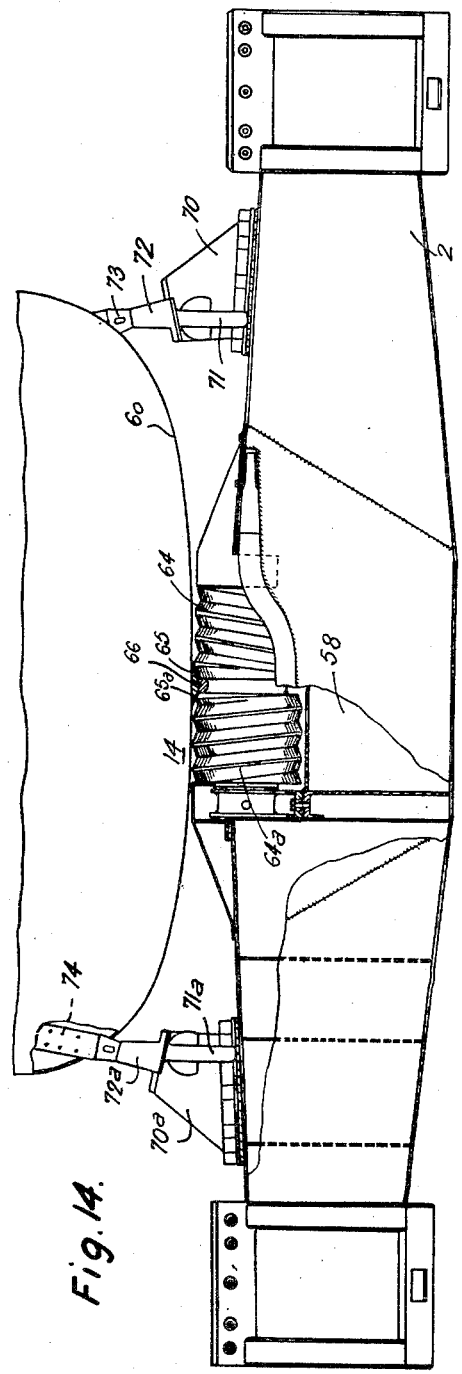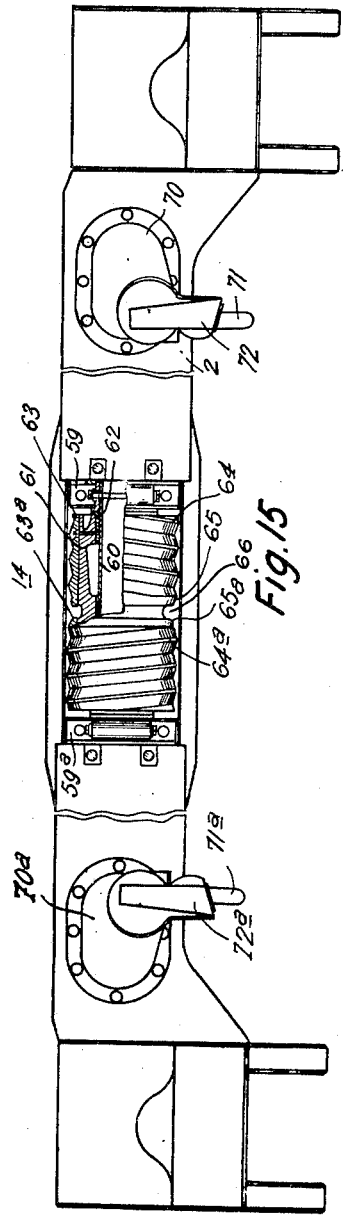

2,779,557

AIRCRAFT LAUNCHING CARRIAGE

Wsiewolod John Jakimiuk and Georges Jules Bernard Victor Hereil, Paris, France, assignors to Societe Nationale de Constructions Aeronautiques du Sud-Est, Paris, France Application July 23, 1954, Serial No. 445,404

Claims priority, application France October 23, 1953

13 Claims. (Cl. 244—63)

The present invention relates generally to improvements in assemblies adapted for conveying over and launching from rough ground an aircraft having a fuselage and a retractable landing gear, and more particularly to assemblies of the type comprising a launching carriage adapted to support the aircraft to be launched with the belly of its fuselage resting on the carriage, provided with propelling means for moving said carriage to launch the aircraft hoisted on said carriage and with braking means for applying a braking force thereto, and coupled to a powered cross-country vehicle having a winch for hoisting the aircraft on the carriage and drive means for conveying the carriage to a starting position to launch the hoisted aircraft therefrom, said carriage further having front and rear centering rollers for causing the longitudinal planes of symmetry of said carriage and of the hoisted aircraft to coincide and a device for retaining the aircraft on said carriage, said device being actuatable by the pilot for releasing the aircraft from the carriage. Such an assembly has been previously described in the application Ser. No. 349,016, filed by applicants April 15, 1953.

In such assemblies, the aircraft, at the time when the carriage reaches the take-off speed, still rests upon said carriage by the belly of its fuselage, so that when the pilot releases the retaining means said aircraft must at first freely assume an attitude of flight before leaving said carriage, whereby accidental damage may be caused on the lower surface of the wings.

With a view to avoid such disadvantage the main object of the present invention is to provide in an assembly of the character described means on the carriage to maintain the aircraft in the attitude of flight it assumes as soon as the pilot releases the retaining means.

Another object of the present invention is to provide in an assembly of the character described means on the carriage for drivingly interconnecting the same and the aircraft for moving said carriage and said aircraft to launch the latter, said aircraft either resting on the carriage by the belly of its fuselage or being maintained in its attitude of flight.

Another object of the invention is to provide in an assembly of the character described means on the carriage for transversally maintaining the aircraft with respect to the carriage, said aircraft either resting on said carriage by the belly of its fuselage or being maintained in its attitude of flight.

A further object of the invention is to provide in an assembly of the character described means on the carriage for temporarily coupling the aircraft therewith so as rapidly to free the landing-field from freshly-landed aircraft.

The accompanying drawings forming part of this invention illustrate diagrammatically by way of example the manner in which the invention may be carried out in practice. In the drawings:

Fig. 1 is a side elevational view showing a take-off carriage according to the invention, with an aircraft supported thereby, the left-hand wheel of the rear set of wheels being removed and the auxiliary carriage-propelling rockets being omitted;

Fig. 2 is a fragmentary side view showing the aircraft fuselage bottom reinforced by a member adapted to engage the front centering roller of the carriage;

Figs. 3 and 4 are sections taken upon the lines III—III and IV—IV of Fig. 2, respectively;

Fig. 5 is a fragmentary side view showing the aircraft fuselage belly equipped with its rear spur member;

Figs. 6, 7, 8 and 9 are sections taken upon the lines VI—VI, VII—VII, VIII—VIII and IX—IX of Fig. 5, respectively;

Fig. 10 is a side elevational view at a greater scale showing the front-roller supporting frame;

Fig. 11 is a front view, with parts broken away, showing the front-roller arrangement;

Figs. 12 and 13 are a side-elevational view and a plan view, respectively, of the hand-actuated locking device in its locked condition;

Fig. 14 is a transverse elevational view showing the rear cross-member of the carriage, equipped with a back roller and transverse stabilizing ramps, an aircraft being supported by the carriage;

Fig. 15 is a plan view with parts broken away, which corresponds to Fig. 14.

Fig. 16 is a sectional view showing at a greater scale a detail of an aircraft-supporting prop.

The carriage according to the present invention comprises a frame structure consisting of a front cross-member 1, a rear cross-member 2 and a pair of lateral sills 3. These four essential components are box-sectioned sheet metal elements interconnected and braced by fish-plates (not shown) in a manner permitting the dismantling of the assembly when required. Forwardly of the front cross-member 1 there is secured a box member 5 having mounted on it a pair of brackets 4, 4a on which a telescopic frame 8 carrying a front centering roller 6 is pivotally mounted as shown. These brackets 4, 4a have hingedly mounted thereon, ahead of the front roller frame 8, a pair of tie-rods 11, 11a for permitting the extension of the telescopic frame 8 when the latter is moved from its folded position shown in Fig. 1, in which the aircraft 10 is supported by the carriage on the belly of its fuselage, to the extended position shown in chain-dotted lines in the same figure, when the aircraft 10 assumes its attitude of flight indicated at 10a.

The front cross-member 1 carries a pin 7 designed through its engagement in a recess formed in the central girder 9 of the aircraft 10, for maintaining the longitudinal stability of the aircraft as long as it is carried by the carriage, while enabling the aircraft to be propelled by the carriage. On the sills 3, between the cross members 1, 2, there is mounted an intermediate cross member supporting a strap device 12 located in an off-centre position with respect to the longitudinal axis of the carriage and adapted to engage a recess formed in the aircraft 10 beyond the girder 9 for cooperating with an aircraft-releasing device. The rear cross-member of the frame structure carries a back central roller 14 for automatically centering the aircraft girder during the hoisting operation. This cross-member carries a pair of arms 15 on which are mounted the stub axles of the rear wheels 16. The front cross-member 1 carries in its centre a spindle having mounted thereon, through the medium of a lever system 17, the pair of front wheels 18. On the rear cross-member are secured a pair of brackets 13 having ramp-like rearward extensions 27 adapted to receive the rockets 87 utilized as auxiliary propelling means for the carriage, as illustrated in dotted lines in Fig. 1.

The front wheels are provided with a shock-absorber 19 consisting of a stacking of resilient discs, for example of rubber, alternating with metal discs, these discs being held between the rear ends of levers 17. The rear wheels 16 are equipped with shock-absorbing devices 20 consisting of stackings of resilient discs, for example of rubber, alternating with metal discs, the holding members of this stacking being pivoted at 16a on the relevant wheel hub and at 21 on the relevant bracket. Above the pivotal connection 21 the shock-absorber 20 includes an additional stacking 22 comprising a few alternate resilient and metal washers for checking rebounds of the rear wheels.

The front roller frame 8 as illustrated in Figs. 10 and 11 consists of a pair of telescopic arms each comprising a tubular member 23 or 23a having slidably mounted therein a tube 24 or 24a guided in the former through a lower ring 25 and an upper ring 26, the latter being of the swivel or self-aligning type; ring 25 is held in position by a pin, a cotter or the like, and ring 26 is secured by a suitable nut 28. Both tubular members 23, 23a are interconnected through a tubular cross-member 29 and braced by tubular struts 30, 30a. Beyond the cross-member 29 the tubular member 23 carries a transverse sleeve 31 in which a self-aligning bearing 32 is held by means of a pair of side rings 33; a pair of ring packings 34 are provided for sealing the bearing against the ingress of dirt. The bearing 32 is secured through a shaft 35 on the bracket 4. Similarly, the tubular member 23a is provided beyond the cross-member 29 with a transverse sleeve 36 in which a self-aligning bearing 37 of greater diameter than bearing 32 is mounted through the medium of rings 38 provided with ring packings 39. The bearing 37 is secured to the bracket 4a through a shaft 40.

On the head of shaft 40 which is positioned internally of the frame 8 there is pivotally attached at 41 one end of an adjustable tie-rod 42 having its other end pivotally attached at 43 on a lug 44 secured to the box member 5, whereby the horizontal stresses acting on the self-aligning bearings 32, 37 and on the parts in which these bearings are mounted for rotation will be transmitted to the carriage for the purpose of reducing the weight and overall dimensions of these bearings. The tie-rod 42 is subject to both compressive and tensile stresses. On the sleeves 31 and 36 there are mounted levers 45, 45a on which are pivoted the rods 46 of corresponding resilient systems each comprising of a cylinder 47 pivoted at one end 48 on the cross-member 1 and closed at the other end by a cap member 47a screwed on the cylinder and receiving the rod 46 therethrough and, pistons (not visible in the drawings) compressing against this cap member 47a springs or discs of synthetic or natural rubber, with or without reinforcement.

The telescopic tubes 24, 24a are provided with end straps 49, 49a having mounted therein corresponding bearing members 50, 50a; between these bearing members there is mounted a shaft 51 carrying the front roller 6. This roller comprises a conveniently lightened cylindrical steel body 51a lined externally with a pair of light-alloy sheaths 52. Each sheath has formed in its outer surface and throughout its length a helical groove 53 of same cross-sectional profile as that of the aircraft girder 9, the two grooves having their inclinations so formed as to converge to the centre, whereby the aircraft girder 9 will be brought automatically to the centre of the front roller 6 when the aircraft is being hoisted on the carriage. This central portion of the roller comprises, on the one hand, two tapered portions 54, 54a formed on the sheaths 52 and, on the other hand, a parallel-faced groove formed between the two sheaths 52 and partly on the body 51.

The end straps 49, 49a are provided with pins 56, 56a on which are pivoted the rear ends of the tie-rods 11, 11a of which the front ends are pivoted at 57 on the brackets 4 ahead of the hinge bearings of frame 8.

The rear cross-member 2 carries on its central portion the back centering roller 14. This cross-member 2, as shown clearly in Figs. 14 and 15, comprises a central box member 58 having a pair of bearings 59 and 59a mounted thereon. A tubular shaft 60 carrying the back roller 14 is journalled in these bearings. This back roller comprises a lightened steel cylindrical body 61 associated with a pair of friction rings 62 and provided with a pair of light alloy outer sheaths 63, 63a. Each sheath has formed throughout its outer surface a helical groove of same profile as that of the girder 9. As in the case of the front roller 6, these grooves 64, 64a are inclined in opposite directions for automatically bringing the aircraft girder 9 to the centre of roller 14 as the girder is moved forwards relative to the roller. The central portion of the roller comprises on the one hand, two tapered portions 65, 65a formed in the sheaths 63, 63a and having the same inclination as the faces of keel 9, and, on the other hand, a parallel-faced groove formed between the two sheaths and partly in the body 61.

In order to maintain the aircraft in axial alignment with the carriage and, at the same time, to make it possible to enable the carriage to be driven by the aircraft, the girder 9, as shown in Fig. 5, is provided with a rib-shaped member 67 located in the zone designed to remain in engagement with the roller 14. The front portion of this rib-shaped member has the same cross-sectional profile as the girder 9, as shown in Figs. 6 and 7. It is formed with a spur-like part having a substantially semicircular recess 68 having a parallel-faced rib 69 corresponding to and adapted to engage, the groove 66 for maintaining the rear portion of the aircraft in the transverse direction.

When the aircraft is hoisted on the carriage according to the operative steps described in the prior patent application Ser. No. 359,016, after having caused the back roller 14 to roll under the aircraft due to the backward movement of the carriage, as the aforesaid roller clears the transverse vertical plane passing through the centre of gravity of the aircraft, the aircraft tail is lifted and its nose lowered, whereby the telescopic frame 8 will be tilted down from its extended position shown in chain-dotted lines in Fig. 1 to its folded position shown in thick lines in the same figure. The downward movement of the aircraft is retarded by the pull exerted through the levers 45 on the rods 46 of the resilient devices 47, whilst the tie-rods 11, 11a cause the tubes 24, 24a to penetrate into the tubular members 23, 23a.

During the take-off, the aircraft power-plant is started, as well as the carriage rockets, if any. The aircraft gradually assumes its attitude of flight by changing the position of its fuselage from that shown at 10 in Fig. 1 to that shown at 10a in the same figure by pivoting about the axis of roller 14, the latter being engaged by the semi-circular recess 68 of the spur-like part of the rib-shaped member 67, whereby the carriage can be driven by the aircraft. At the same time, under the influence of the resilient systems 47 the telescopic frame 8 is extended to the position shown in chain-dotted lines in Fig. 1, the tubes 24, 24a emerging from the tubular members 23, 23a under the action of the tie-rods 11, 11a, thereby keeping the front roller 6 in engagement with the lower portion of the fuselage in that portion of the girder 9 which is reinforced by a rib-shaped member 27a. This rib-shaped member 27a has a main sectional profile 57a similar to that of the groove 55 of the front roller 6 and remains in engagement therewith, whereas the rib 69 of the semi-circular recess 68 of the rib-shaped member 67 remains in engagement with the groove 66 formed in the back roller 14. The simultaneous penetrations of these ribs into the relevant grooves are maintained irrespective of the successive positions occupied by the aircraft, from position 10 to position 10a, whereby the aircraft will be held in the proper transverse position with respect to the carriage during the passage from its initial position of rest to the position in which its proper angle of incidence is attained.

After the take-off, the carriage is braked by the action of a toothed device 86 of the kind described in application Serial No. 443,038, filed July 13, 1954, in the names of G. B. de Saint-Hippolyte and R. G. Sconzec.

The aircraft stability against transverse tilting movements or rolling on the carriage is obtained by the provision of lateral supports 70, 70a secured on the rear cross-member 2 on either side of the back roller 14. Each support comprises a guide ramp 71 (71a) extending backwards and a bearing member 72 (72a). The bearing members 72, 72a are engaged by props 73, 73a projecting from the fuselage 10 and secured on brackets 74, 74a fixed in turn on a fuselage ring frame. These props 73, 73a have a cylindrical portion 90 (see longitudinal section of Fig. 16) for permitting the rolling of these props on the bearing members 72 as the aircraft is moving from position 10 to position 10a. The length of the bearing members 72 and their preferably tapered shape are determined accordingly.

The take-off carriage according to the present invention may be used not only as such but also for removing freshly-landed aircraft from a landing field and conveying them to hanger or disposal points. In this last case, it would ordinarily be necessary to use the holding device 12 described in the prior patent application Ser. No. 349,016 for retaining the aircraft on the carriage, this device cooperating with a release device mounted on the aircraft. However, this operation is a relatively time-consuming one and if, on account of the other operations to be effected, this time loss is not detrimental to the take-off proper, it is on the other hand prohibitive as regards the use of the carriage in view of freeing the landing-field. This disadvantage can be avoided by equipping the carriage according to the invention with a hand-controlled locking device illustrated in Figs. 12 and 13 which, being positioned at the front of the carriage, is therefore readily accessible.

On the cross element 29 of frame 8 there is secured a lug 75 having fulcrumed thereon through a pin 76 a bell-crank lever of which one arm 77 is formed with a hook portion 78, the other arm 79 of this lever being provided with a handle 80. A pair of tension springs 81 are anchored on either side of bell-crank lever arm 77 and lug 75, as shown. This lug 75 also carries a riveted or otherwise secured leaf spring 82 carrying on its free end a stud 83 adapted to engage a hole 84 formed in the arm 79 of the bell-crank lever. In its unlocked position, shown in dotted lines Fig. 10, the bell-crank lever is retained by the stud 83. When it is desired to operate this locking device after having hoisted the aircraft on the carriage, the arm 79 is released from the stud 83 and the bell-crank lever is lifted by means of the handle 80, as shown in Fig. 12, the hook portion 78 engaging a recess 85 provided for this purpose in the aircraft fuselage and being urged to this locking position by the force of the tension springs 84 due to the over-centre effect resulting from the specific arrangement of the parts involved.

Of course, many modifications and alterations may be contemplated in the arrangement shown and described herein, without departing from the spirit and scope of the invention. Thus, the front roller may be of the type described in the prior patent application Ser. No. 349,016, i. e. with a parallel-faced central groove but without the lateral helical grooves.

What we claim is:

1. In an assembly, for conveying over and launching from rough ground an aircraft having a fuselage and a retractable landing gear, of the type comprising a launching carriage to support the aircraft by the belly of its fuselage and having a rectangular structure with two cross-members and two sills, provided with propulsion means for conveying the carriage with the aircraft hoisted thereon to launch the aircraft and with braking means to apply a braking force to the carriage, and adapted to be associated with a cross-country tractor vehicle for hoisting the aircraft onto and conveying the carriage and having a winch thereon, said carriage being further provided with front and rear centering rollers for causing the longitudinal planes of symmetry of the hoisted aircraft and the carriage to coincide and with means releasable by the pilot of the aircraft for retaining the aircraft on the carriage: the improvement comprising means on the carriage for supporting the aircraft thereon in attitude of flight with the retaining means released, reciprocal drive means on the carriage for moving the carriage and aircraft to launch the latter selectively either with the belly of its fuselage resting on the carriage or in attitude of flight, and means on the carriage for supporting the aircraft transversely with respect to the carriage.

2. A launching carriage, according to claim 1 wherein the means for supporting the aircraft in attitude of flight comprises, a rigid frame on which the front centering roller is pivotally mounted and forming the upper cross-member of said frame, telescopic tubes forming the side members of said frame comprising upper and lower tubes, the upper tubes being slidable relatively to the lower tubes, a box member secured on the front ends of the sills of said carriage for extending the latter toward the front, two bearings respectively secured on said box member in front of the front cross-member of the carriage, aligned at right angles to the sills of the carriage and on which are pivoted the lower tubes of the side members of said carriage, to permit swinging of the frame to horizontal position under the weight of the aircraft hoisted and secured on the carriage and resting on the front roller and means for simultaneously controlling the sliding extension of the upper tubes of said telescopic side members relatively to the lower tubes and the raising of said frame, the belly of the fuselage being shaped to pivot on the rear centering roller, whereby with the retaining means released by the pilot, said aircraft pivots about the rear centering roller for assuming an attitude of flight while the front part of its fuselage is supported by the front centering roller due to the extension of the frame which simultaneously rises.

3. An assembly, according to claim 2 wherein the belly of the aircraft fuselage comprises a rib-shaped fitting secured thereon in the zone in which said fuselage contacts the rear centering roller at the end of the hoisting operation, said fitting being formed with a spur-like part having a circular recess which surrounds a substantial surface of said rear centering roller.

4. An assembly, according to claim 2, wherein the means for simultaneously controlling the extension of the telescopic side members and the raising of the frame comprises, for each telescopic side member, a support directed toward the front of the carriage and secured at the front end of the box member, a tie-rod the ends of which are pivotally secured on the front end of said support and on the top of the upper telescopic tube, respectively, a lever pivotally mounted on the corresponding bearing and connected to the lower telescopic tube, and a resilient device connected to the front cross-member and compressed by the action of said lever when the frame is in substantially horizontal position under the weight of the aircraft hoisted and retained on the carriage.

5. An assembly, according to claim 2, further comprising an adjustable strut for transmitting the horizontal stresses acting on the bearings, a first support mounted on the articulation pin of one of said bearings and pivotally supporting one end of said strut and second support secured on the box-member and pivotally supporting the other end of said strut.

6. An assembly, according to claim 2, wherein the front and rear rollers have a profile corresponding to the shape of the fuselage bottom in the zone in which said fuselage bears on said rollers, and wherein at least the rear roller is formed on its outer surface with two series of helical grooves inclined in reverse direction and converging towards its center.

7. An assembly, according to claim 1, wherein the means for drivingly interconnecting the carriage and the aircraft comprises a pin slidably mounted on the front cross-member of the carriage, elastically braked and adapted to penetrate within a recess formed in the bottom of the aircraft fuselage, and a rib-shaped like fitting secured under the belly of said fuselage in the zone in which the fuselage of the hoisted aircraft contacts the rear centering roller and formed with a spur like part having a semi-circular recess which surrounds a substantial surface of said rear centering roller.

8. An assembly, according to claim 1, wherein the means for transversally maintaining the aircraft with respect to the carriage comprises means for transversally retaining the bottom of the fuselage on the front and rear centering rollers and means for stabilizing the aircraft mounted on said rollers against transverse tilting.

9. An assembly, according to claim 8, wherein the front and rear rollers have their central part formed with a parallel faced groove and wherein the means for transversally retaining the aircraft fuselage bottom on said rollers comprises, for each roller, a fitting formed with a parallel-faced rib and fixed under the central part of the fuselage bottom in the zone in which the fuselage of the hoisted aircraft contacts said roller for engaging the parallel-faced groove formed therein.

10. An assembly, according to claim 8, wherein the front and rear rollers have their central part formed with a parallel-faced groove and wherein the means for transversally retaining the aircraft fuselage bottom on said rollers comprises, for each roller, a fitting formed with a parallel-faced rib and fixed under the central part of the fuselage bottom in the zone in which the fuselage of the hoisted aircraft contacts said roller, for engaging the parallel-faced groove formed therein, the rear fitting having a spur-like part formed with a semi-circular recess, the parallel-faced rib of said rear fitting extending in said recess.

11. An assembly, according to claim 8, wherein the means for stabilizing the aircraft mounted on the rollers against transverse tilting comprises two ramps secured on the rear cross-member of the carriage and two pin-like structures secured on the side of the aircraft fuselage, slightly projecting from the latter and bearing on said ramps, the shape and length of said ramps as well as the shape of the pin-like structures being so determined that said pin-like structures engage said ramps whether the aircraft hoisted on the carriage rests on the latter by the belly of its fuselage or assumes its attitude of flight.

12. An assembly, according to claim 1, further comprising a readily accessible temporary coupling device for the aircraft with a view to rapidly free the landing-field from freshly-landed aircraft.

13. An assembly, according to claim 12, wherein the readily accessible temporary coupling device comprises a coupling lock secured on the front central part of the carriage and manually operated, and a recess provided in the bottom of the fuselage ahead of the part of said bottom which engages the front centering roller, for engaging said lock.

References Cited in the file of this patent
UNITED STATES PATENTS

| | | |
|---|---|---|
| 2,135,033 | Courtney | Nov. 1, 1938 |
| 2,604,279 | Gerin | July 22, 1952 |
| 2,647,776 | Wallis | Aug. 4, 1953 |
| 2,659,553 | Wallis | Nov. 17, 1953 |

FOREIGN PATENTS

| | | |
|---|---|---|
| 882,390 | France | Mar. 1, 1943 |
| 909,544 | France | Jan. 2, 1946 |
| 1,007,644 | France | Feb. 13, 1952 |